(12) United States Patent
Borrelli et al.

(10) Patent No.: US 11,239,566 B2
(45) Date of Patent: Feb. 1, 2022

(54) FRESNEL PHASE LENSES FOR 5G APPLICATIONS

(71) Applicant: CORNING INCORPORATED, Corning, NY (US)

(72) Inventors: Nicholas Francis Borrelli, Elmira, NY (US); Joseph Francis Schroeder, III, Lindley, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/023,751

(22) Filed: Sep. 17, 2020

(65) Prior Publication Data

US 2021/0098887 A1 Apr. 1, 2021

Related U.S. Application Data

(60) Provisional application No. 62/906,392, filed on Sep. 26, 2019.

(51) Int. Cl.
| | |
|---|---|
| *H01Q 15/00* | (2006.01) |
| *H01Q 19/06* | (2006.01) |
| *H01Q 15/10* | (2006.01) |
| *G02B 3/08* | (2006.01) |
| *H01Q 15/08* | (2006.01) |

(52) U.S. Cl.
CPC ........... *H01Q 15/0033* (2013.01); *G02B 3/08* (2013.01); *H01Q 15/08* (2013.01); *H01Q 15/10* (2013.01); *H01Q 19/06* (2013.01)

(58) Field of Classification Search
CPC .. H01Q 19/065; H01Q 15/0033; H01Q 19/06; H01Q 19/062; H01Q 15/10; H01Q 15/02; H01Q 15/08; G02B 3/08
See application file for complete search history.

(56) References Cited

U.S. PATENT DOCUMENTS

| | | | | |
|---|---|---|---|---|
| 5,675,349 | A | * 10/1997 | Wong | G01S 13/426 343/910 |
| 2004/0130785 | A1 | * 7/2004 | Yun | G02B 3/08 359/565 |
| 2006/0132379 | A1 | * 6/2006 | Peterson | H01Q 19/062 343/910 |
| 2015/0236428 | A1 | * 8/2015 | Caratelli | H01Q 5/45 343/755 |

FOREIGN PATENT DOCUMENTS

| | | | | |
|---|---|---|---|---|
| WO | WO-2007006951 A1 | * 1/2007 | | H01Q 15/08 |
| WO | 2019/173369 A1 | 9/2019 | | |

* cited by examiner

*Primary Examiner* — Dimary S Lopez Cruz
*Assistant Examiner* — Yonchan J Kim
(74) *Attorney, Agent, or Firm* — Svetlana Z. Short (57) ABSTRACT

A Fresnel phase lens for a 5G antenna is described herein. The Fresnel phase lens includes a glass-ceramic material having a first major surface and a second major surface. The first major surface and the second major surface define a thickness therebetween, and the first major surface defines a plane. The glass-ceramic material includes a first plurality rings having first ring surfaces in the plane and a second plurality of rings having second ring surfaces at a first depth into the thickness and below the plane. The glass ceramic material is transparent to electromagnetic radiation having a frequency of from 20 GHz to 100 GHz.

20 Claims, 4 Drawing Sheets

FRESNEL PHASE LENSES FOR 5G APPLICATIONS

CROSS-REFERENCE TO RELATED APPLICATIONS

This application claims the benefit of priority under 35 U.S.C. § 119 of U.S. Provisional Application Ser. No. 62/906,392 filed on Sep. 26, 2019 the content of which is relied upon and incorporated herein by reference in its entirety.

BACKGROUND

The disclosure relates generally to lenses and, in particular, to a Fresnel phase lens configured to enhance 5G signals from antenna arrays. Deployment of the 5G network has required the installation of many new antennas to send and receive 5G signals. Such antennas relay data throughout the network in a highly directional manner. Efficient sending and receiving of these 5G signals allows for the 5G network to be built out in an economical manner.

SUMMARY

In one aspect, embodiments of the disclosure relate to a Fresnel phase lens for a 5G antenna. The Fresnel phase lens includes a glass-ceramic material having a first major surface and a second major surface. The first major surface and the second major surface define a thickness therebetween, and the first major surface defines a plane. The glass-ceramic material includes a first plurality rings having first ring surfaces in the plane and a second plurality of rings having second ring surfaces at a first depth into the thickness and below the plane. The glass ceramic material is transparent to electromagnetic radiation having a frequency of from 20 GHz to 100 GHz.

In another aspect, embodiments of the disclosure relate to an antenna unit. The antenna unit includes an antenna array having a plurality of antennas. The antenna array defines a first plane. The antenna unit also includes a Fresnel phase lens made of a glass-ceramic material transparent to electromagnetic radiation having a frequency from 20 GHz to 100 GHz. The Fresnel phase lens has a first major surface and a second major surface. The first major surface and the second major surface define a thickness therebetween. The Fresnel phase lens defines a second plane, and the Fresnel phase lens is spaced apart from the antenna array such that the second plane is substantially parallel to the first plane of the antenna array. The Fresnel phase lens also includes a first plurality rings having first ring surfaces at least partially defining the first major surface and a second plurality of rings having second ring surfaces at a first depth into the thickness and below the first major surface. The first plurality of rings and the second plurality of rings collimate the electromagnetic radiation incident on the Fresnel phase lens that is transmitted to or emitted from the antenna array.

In still another aspect, embodiments of the disclosure relate to a method of producing a Fresnel phase lens. In the method, a glass-ceramic material transparent to electromagnetic radiation having a frequency of 20 GHz to 100 GHz is provided. The glass-ceramic material has a first major surface and a second major surface. The first major surface is opposite to the second major surface, and the first major surface and the second major surface define a thickness therebetween. Also, in the method, material is removed from the first major surface of the glass-ceramic material so as to define a Fresnel phase lens including a first plurality of rings and a second plurality of rings. The first plurality of rings have first ring surfaces at the first major surface, and the second plurality of rings have second rings surfaces at a first depth below the first major surface.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments. In the drawings.

DETAILED DESCRIPTION

Embodiments of the present disclosure relate to a glass-ceramic Fresnel phase lens configured to collimate transmitted electromagnetic radiation (in particular, 5G signals at microwave frequencies) so as to increase the broadcast distance of the antenna structure. Advantageously, the Fresnel phase lens produces additional gain so that the antenna gain can be reduced. In conventional designs, efforts to increase antenna gain resulted in overheating, which limited the possible distance between antennas. Embodiments of the glass-ceramic Fresnel phase lenses disclosed herein include sections with alternating radial regions of prescribed depths whose spacings are dictated by the intended value of the lens focal length at the specified microwave frequency. Advantageously, the Fresnel phase lenses can be machined by conventional tooling to create the alternating rings. The machinability of the glass-ceramic stems from the uniform and small grain sizes (<1 µm) typical of glass-ceramic materials in contrast to large grain ceramic materials. Indeed, other materials cannot be machined to the precise tolerances necessary to produce the dimensions required for Fresnel phase lens. The Fresnel phase lenses can be produced through various material removal tooling techniques, such as milling or grinding.

Applicant believes that the Fresnel phase lenses described herein are applicable to antenna units for the 5G infrastructure. As used herein, "5G" refers to signals transmitted via microwaves, in particular having a frequency of 20 GHz to 100 GHz. The 5G network includes many individual antenna units (patches) that transmit directional waves to other antenna units. Applicants have found a way to enhance the lens gain of the antenna units by collimating the transmitted beam. In this way, the antenna units can transmit and receive over greater distances, thereby reducing the required number of antenna units in the network. Various embodiments of a Fresnel phase lens for an antenna unit, in particular that is usable in the 5G infrastructure, are disclosed herein. These embodiments are presented by way of example and not by way of limitation.

Figure 1:
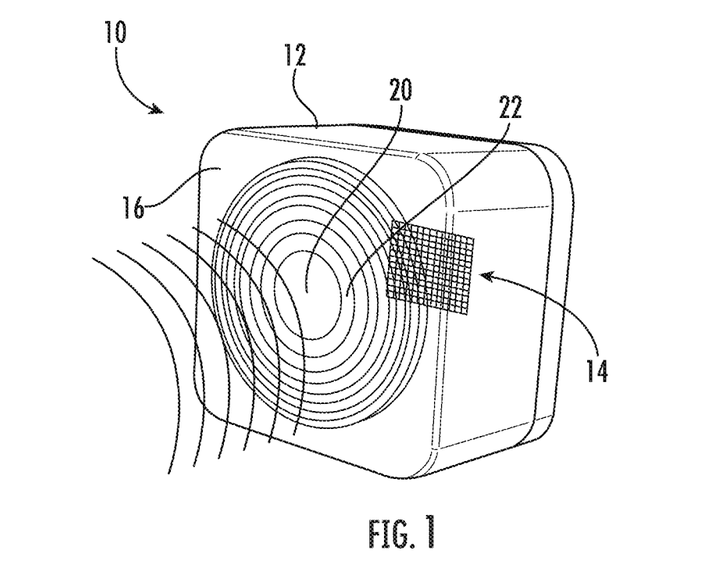
FIG. 1 depicts an antenna unit incorporating a Fresnel phase lens, according to an exemplary embodiment.

FIG. 1 depicts an embodiment of an antenna unit 10 having a housing 12 surrounding an antenna array 14. In embodiments, the antenna array 14 comprises a plurality of individual antennas, such as patch antennas, mounted to a ground plane. In embodiments, the patch antennas are rectangular sheets (i.e., "patches") of metal that may be connected with microstrip transmission lines so as to group the antennas into multiple phased arrays. The housing 12 includes a cover plate, which according to the present disclosure is configured as a Fresnel phase lens 16. In embodiments, the Fresnel phase lens 16 is a planar substrate arranged substantially parallel to and spatially disposed from a plane defined by the antenna array 14. By "substantially parallel," it is meant that the plane of the Fresnel phase lens 16 is parallel to within +/−5° to the plane of the antenna array. As will be disclosed herein, the Fresnel phase lens 16 acts to collimate the electromagnetic waves incident upon the Fresnel phase lens 16 emitting from a particular region of the antenna array 14.

In order to enhance the radiation (effective gain), the Fresnel phase lens 16 includes a series of rings having a pattern of depths. In the embodiment of FIG. 1, the Fresnel phase lens 16 is depicted having a first plurality of rings 20 and a second plurality of rings 22. As will be appreciated from the discussion that follows, the Fresnel phase lens 16 focuses the incoming or outgoing waves via diffraction from the first plurality of rings 20 and the second plurality of rings 22. In embodiments, the first plurality of rings 20 have ring surfaces defining an outermost plane of the Fresnel phase lens 16, and the second plurality of rings 22 are machined into the surface of the Fresnel phase lens 16 such that the second plurality of rings 22 have ring surfaces at a depth below the plane defined by the first plurality of rings 20. While the embodiment of FIG. 1 is depicted such that the first plurality of rings 20 and the second plurality of rings 22 alternate, the Fresnel phase lens 16 could include stepped rings having three or more levels of ring surfaces.

Figure 2:
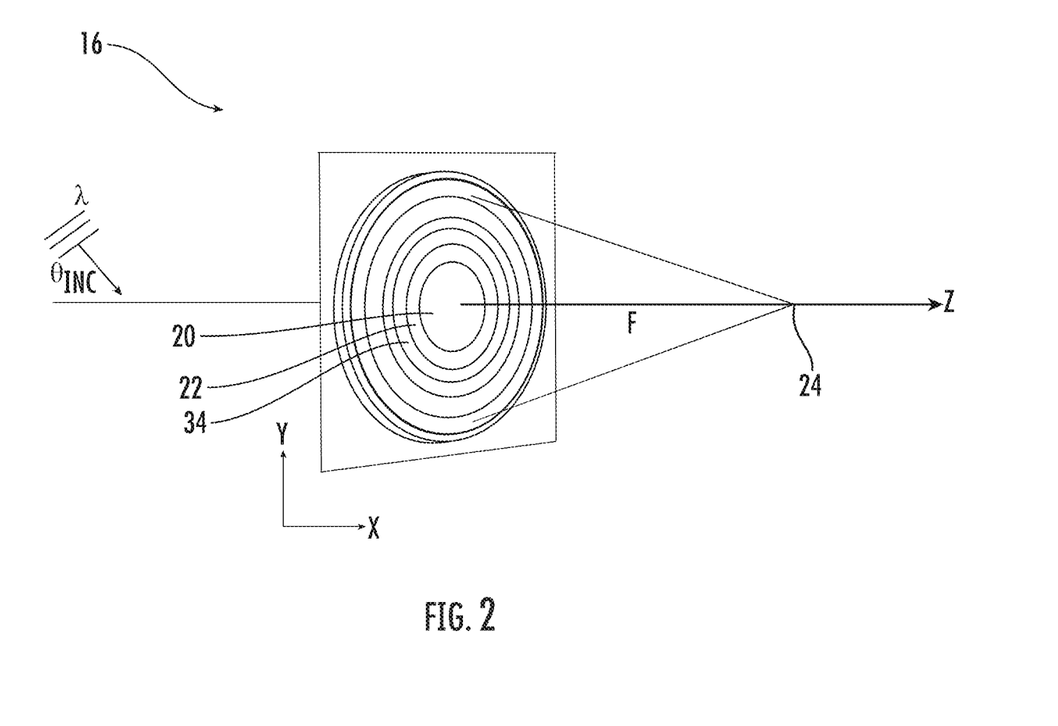
FIG. 2 depicts a Fresnel phase lens, according to an exemplary embodiment.

Referring now to FIG. 2, the principle behind the Fresnel phase lens 16 is illustrated. In contrast to FIG. 1, the Fresnel phase lens 16 of FIG. 2 includes a third plurality of rings 34. As can be seen in FIG. 2, a wave having wavelength λ is incident (either incoming or outgoing) on the Fresnel phase lens 16. The Fresnel phase lens 16 is substantially perpendicular to the incident wave. In FIG. 2, the Fresnel phase lens 16 defines a plane (XY-plane), and the wave propagates along the Z-axis, normal to the XY-plane. The Fresnel phase lens 16 diffracts incident electromagnetic radiation through the pluralities of rings 20, 22, 34 at different depths towards a focal point 24 at a focal length f along the Z-axis. Similarly, radiation emitted from the antenna is collimated. That is, the emitted beam from the antenna array is spread significantly less allowing it to propagate to longer distances with the same power. In order to produce the desired diffraction pattern and focal length f, the radii of the pluralities of rings 20, 22 are based on the following equation:

$$r_n = \sqrt{\left[\left(2/p\ \lambda f + n\left(\frac{2\lambda}{p}\right)^2\right)\right]} \tag{1}$$

In Equation 1, $r_n$ is the radius of the nth ring of the Fresnel phase lens 16, n is the integer number of rings, λ is the wavelength of the incident wave, f is the focal length, and p is the number of levels in the in the Fresnel phase lens 16 (which, in the embodiment of FIG. 2, is three). The equation considers a wave that is incident at an incident angle $\theta_{inc}$ of 0°. When the incident angle $\theta_{inc}$ is 0° (i.e., the incident wave is substantially normal (e.g., within +/−5°) to the plane of the Fresnel phase lens 16), the Fresnel phase lens 16 will diffract waves directly in line with an axis perpendicular to and passing through the center of the Fresnel phase lens 16 at the focal length f away from the Fresnel phase lens 16. Thus, in designing the antenna 10 of FIG. 1, the antenna array 14 would preferably be placed at the focal length f away from the Fresnel phase lens 16 so that the maximum intensity of the wave is received by the antenna array 14.

Figure 3:
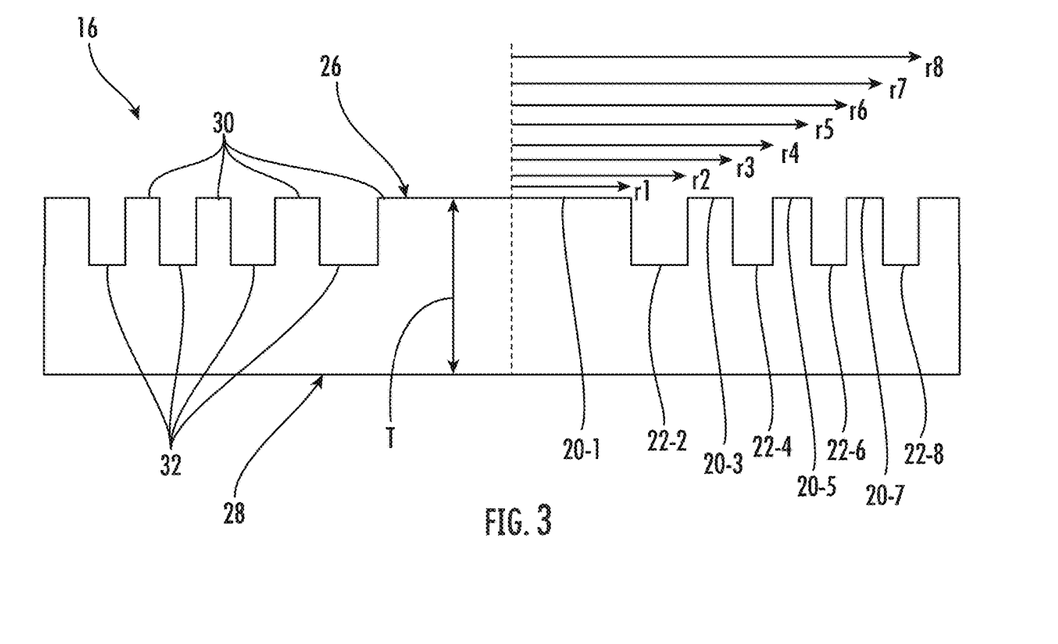
FIG. 3 depicts a two-level Fresnel phase lens, according to an exemplary embodiment.

FIG. 3 depicts an exemplary embodiment of a Fresnel phase lens 16 designed according to Equation 1 for a two-level Fresnel phase lens 16. The Fresnel phase lens 16 has a first major surface 26 and a second major surface 28. The second major surface 28 is opposite of the first major surface 26, and the first major surface 26 and the second major surface 28 define a thickness T therebetween. In embodiments, the thickness T is from about 4.5 mm to about 6.5 mm. In embodiments, the thickness is selected to minimize reflection loss. In embodiments, other thicknesses may be used depending on the material of the Fresnel phase lens. As can be seen, the Fresnel phase lens 16 of FIG. 3 includes a first plurality of rings 20 alternating with a second plurality of rings 22. The first plurality of rings 20 have first ring surfaces 30 defining, at least in part, the first major surface 26 of the Fresnel phase lens 16. The second plurality of rings 22 have second ring surfaces 32 machined into the first major surface 28 of the Fresnel phase lens 16. In embodiments, the second ring surfaces 32 are substantially parallel to and located at a depth below the first ring surfaces 30 (i.e., into the thickness T of the Fresnel phase lens 16).

Table 1, below, provides the radius of each ring of the pluralities of rings 20, 22. This exemplary embodiment of the Fresnel phase lens 10 was based on a lens with a 10 cm focal length f operating at 60 GHz. In this particular embodiment, the first ring 20-1 of the first plurality of rings 20 is a solid circle having a radius $r_1$ of 22.9 mm followed by a second ring 22-2 of the second plurality of rings 22 having a radius $r_2$ of 33.1 mm, corresponding to a ring width of 10.2 mm. As the rings expand outward, the width of the rings decreases in each successive ring (20-3, 22-4, 20-5, 22-6, 20-7). Here, the eighth ring 22-8 has a radius $r_8$ of 74.8 mm and a width of 6.1 mm.

TABLE 1

Zone Plate with Eight Rings and Two Levels

| Ring | Radius (mm) | Width (mm) |
|---|---|---|
| $r_1$ | 22.9 | — |
| $r_2$ | 33.1 | 10.2 |
| $r_3$ | 41.5 | 8.4 |
| $r_4$ | 48.9 | 7.4 |
| $r_5$ | 55.9 | 7.0 |
| $r_6$ | 62.4 | 6.5 |
| $r_7$ | 68.7 | 6.3 |
| $r_8$ | 74.8 | 6.1 |

The Fresnel phase lens 16 shown in FIG. 3 is referred to as a two-level phase lens. Each two rings define a step of the Fresnel phase lens 16. Thus, the first ring 20-1 and second ring 22-2 define a step, the third ring 20-3 and the fourth ring 22-4 define a step, and so on. In embodiments, the Fresnel phase lens 16 has more than two levels (or more than one step). For example, the exemplary embodiment of a Fresnel phase lens 16 shown in FIG. 4 includes three levels. As can be seen in FIG. 3, the levels are defined by a first plurality of rings 20, a second plurality of rings 22, and a third plurality of rings 34. As with the previous embodiment, the first plurality of rings 20 has first ring surfaces 30 in the plane of the first major surface 26, and the second plurality of rings 22 has second ring surfaces 32 at a depth below the first ring surfaces 30. Similarly, the third plurality of rings 34 has third ring surfaces 36 at a depth below the second ring surfaces 32. Each of the ring surfaces 30, 32, 36 is substantially parallel to and spatially disposed from the other ring surfaces 30, 32, 36. Table 2, below, provides the radius of each ring of the pluralities of rings 20, 22, 34 for the three-level phase lens of FIG. 4.

TABLE 2

Zone Plate with Twenty-Two Rings and Three Levels

| Ring | Radius (mm) |
|---|---|
| $r_1$ | 18.3 |
| $r_2$ | 25.9 |
| $r_3$ | 31.9 |
| $r_4$ | 36.9 |
| $r_5$ | 41.5 |
| $r_6$ | 45.6 |
| $r_7$ | 49.5 |
| $r_8$ | 53.1 |
| $r_9$ | 56.5 |
| $r_{10}$ | 59.8 |
| $r_{11}$ | 63.0 |
| $r_{12}$ | 66.0 |
| $r_{13}$ | 69.0 |
| $r_{14}$ | 71.9 |
| $r_{15}$ | 74.7 |
| $r_{16}$ | 77.4 |
| $r_{17}$ | 80.1 |
| $r_{18}$ | 82.7 |
| $r_{19}$ | 85.3 |
| $r_{20}$ | 87.8 |
| $r_{21}$ | 90.3 |
| $r_{22}$ | 92.7 |

Figure 4:
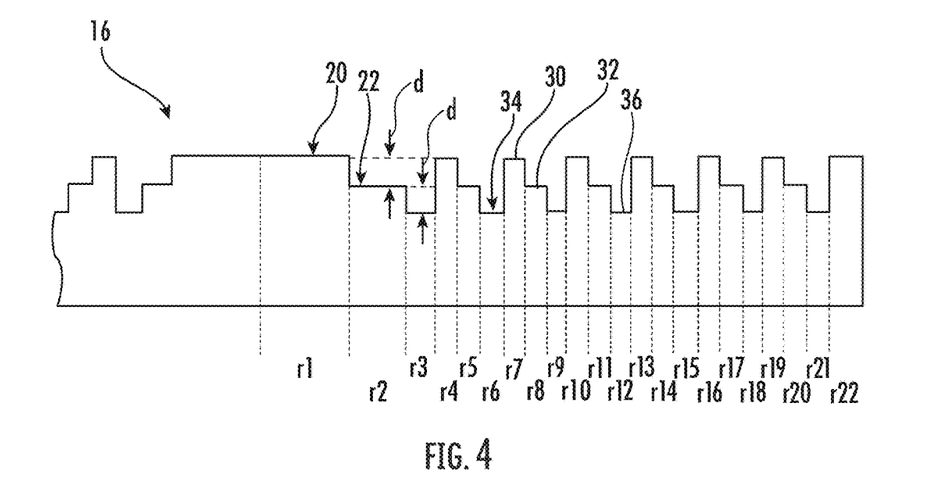
FIG. 4 depicts a three-level Fresnel phase lens, according to an exemplary embodiment.

In order to create the levels as shown in FIGS. 3 and 4, the depth d of the step between levels is determined by the following equation:

$$d = \lambda/p(\sqrt{\epsilon}-1) \quad (2)$$

In Equation 2, $\lambda$, k, and p were previously defined, and $\epsilon$ is the dielectric constant of the glass-ceramic at the specified wavelength $\lambda$. For the simplest case of p=2 (two steps) the depth of each groove, determined by Equation 2, is constant between each ring. For p=3 (three steps), the ring radii are still determined by Equation 1, but now there are two steps (three levels) so the depth "d" is repeated at each step as shown in FIG. 4.

From Equation 2, it can be seen that the depth d depends on the material from which the zone plate is made because the depth d depends in part on the dielectric constant of the material. As discussed above, the material from which the zone plate is made is a glass-ceramic. Particularly, the glass-ceramic is transparent to millimeter waves, particularly to waves having a frequency of in the range of 5G signals (e.g., 20 GHz to 100 GHz). In embodiments, the glass-ceramic material transmits at least 80% of incident waves in the range of 20 GHz to 100 GHz. In other embodiments, the glass-ceramic material transmits at least 90% of incident waves in the range of 20 GHz to 100 GHz, and in still other embodiments, glass-ceramic material transmits at least 95% of incident waves in the range of 20 GHz to 100 GHz. The transparency of the glass-ceramic may also be described in terms of the loss tangent (tan δ) in the range of 20 GHz to 100 GHz. The loss tangents for various glass-ceramic materials usable in the Fresnel phase lens are provided below in Table 3. In embodiments, the glass-ceramic materials for the Fresnel phase lens have a loss tangent for microwave radiation having a frequency of 20 GHz to 100 GHz of less than 0.02, particularly in the range from 0.013 to 0.00025. Loss tangents in this range correspond to an absorption coefficient ($mm^{-1}$) in the range of 0.07 $mm^{-1}$ to 0.006 $mm^{-1}$. Thus, for example, a glass-ceramic having a thickness of 10 mm would transmit about 93% to 99% of incident radiation.

Additionally, in embodiments, the glass-ceramic has a dielectric constant of at least 5 for all or at least some of the frequency range of 5G signals (e.g., 20 GHz to 100 GHz). Example materials for use as the zone plate include magnesium aluminosilicate glass-ceramics having cordierite crystalline phases (e.g., Corning Pyroceram® 9606), spinel-ghanite glass ceramics, petalite glass-ceramics, and borosilicate glass comprising fluorphlogopite mica (e.g., Corning MACOR® 9658), among others. Table 3, below, provides the dielectric constant and loss tangent for each of the listed glass-ceramics.

TABLE 3

Example glass-ceramic materials suitable for use in the phase lens

| Material | Dielectric constant | Loss tangent tanδ (at 30 GHz/60 GHz) |
|---|---|---|
| Pyroceram ® (9606) | 5.5 | 0.00025/0.00065 |
| Spinel-Ghanite | 5.1 | 0.0075/0.001 |
| Petalite | 5 | 0.005/0.01 |
| MACOR ® (9658) | 5.9 | 0.007/0.013 |

Taking Pyroceram® (Corning 9606) as an example material for the Fresnel phase lens 16, the depth d of the step in the two-level embodiment was 1.87 mm. In the three-level embodiment, the depth of each step was 1.24 mm. Thus, in the third plurality of rings 34, the depth d of the third ring surfaces 36 was 2.48 mm. The levels of the Fresnel phase lens 16 relate to the efficiency of the zone plate in diffracting incident optical power into a designated direction, e.g., towards a receiving antenna array or transmitting to another antenna unit. In particular, the efficiency is defined by Equation 3, below:

$$\eta = sinc^2\left(\frac{\pi}{p}\right) \quad (3)$$

In Equation 3, η is the efficiency, sin c is the cardinal sine function, and p is the number of levels. For a two-level zone plate, the efficiency is approximately 40%, and for the three-level zone plate, the efficiency is approximately 70%. In an embodiment having four levels, the efficiency increases to approximately 81%. The efficiency can be further increased by increasing the number of levels, but as will be discussed below, the loss of precision at the tolerances required to make the steps tends to counteract the gains in efficiency provided by the additional levels.

As mentioned briefly above, glass-ceramics are used for forming the zone plates because of the ease of machining associated with these materials, especially as compared to glass or ceramics. Glass-ceramics are formed initially as glasses, and the amorphous glass structure is heat-treated to induce crystallization. In embodiments, the glass-ceramic is at least 90% crystallized by volume. In other embodiments, the glass-ceramic is at least 95% crystallized by volume. Additionally, the glass-ceramics have a small, uniform grain size with grains that are generally less than 1 μm in size. It is the small, uniform grain size that allows for the ease and precision of machining. Glasses are difficult to machine because of the tendency to break during material removal processes, and ceramics cannot be machined to the same precision because of the much larger grains found in ceramics.

Figure 5:
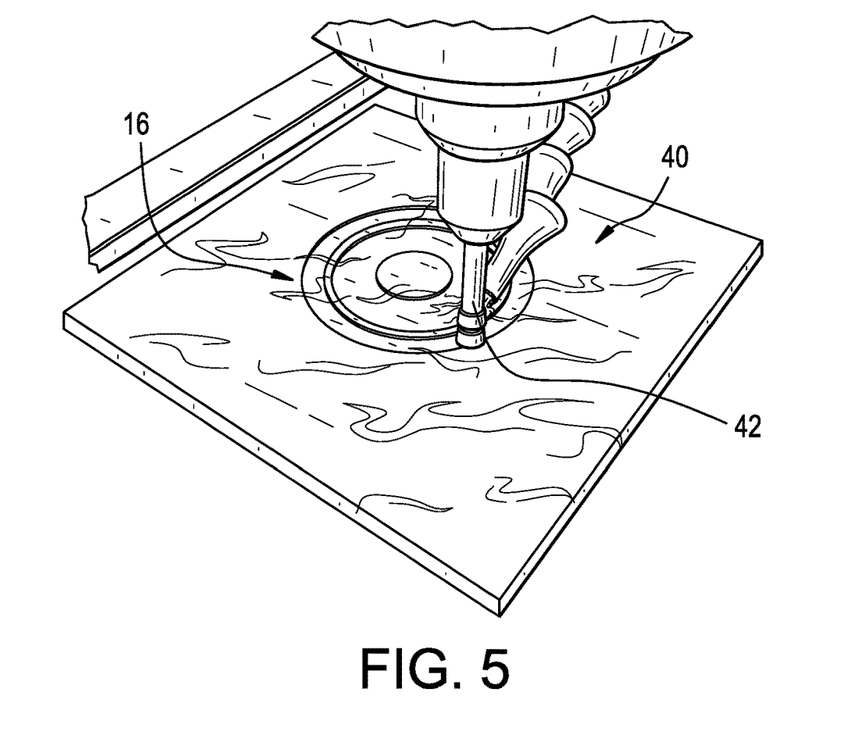
FIG. 5 depicts a glass-ceramic being milled into a Fresnel phase lens, according to an exemplary embodiment.
Figure 6:
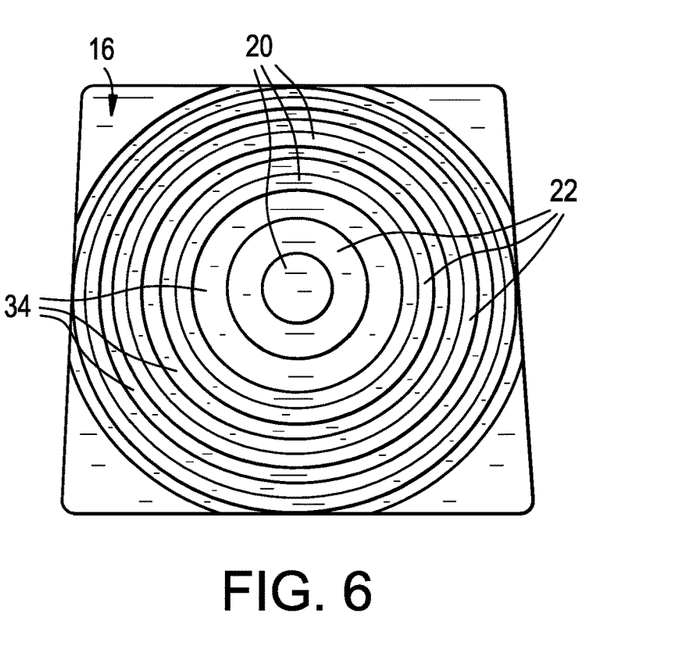
FIG. 6 depicts a glass-ceramic Fresnel phase lens, according to an exemplary embodiment.

FIG. 5 depicts a Fresnel phase lens 16 being machined using a steel bit milling tool As can be seen in FIG. 5, the mill 40 includes a router 42 that removes material from the glass-ceramic material. FIG. 6 depicts a completed Fresnel phase lens 16 after milling. Thus, the glass-ceramic materials used in the Fresnel phase lens 16 according to the present disclosure can be manufactured from sheet material using conventional material removal machining techniques, such as milling and grinding.

Figure 7:
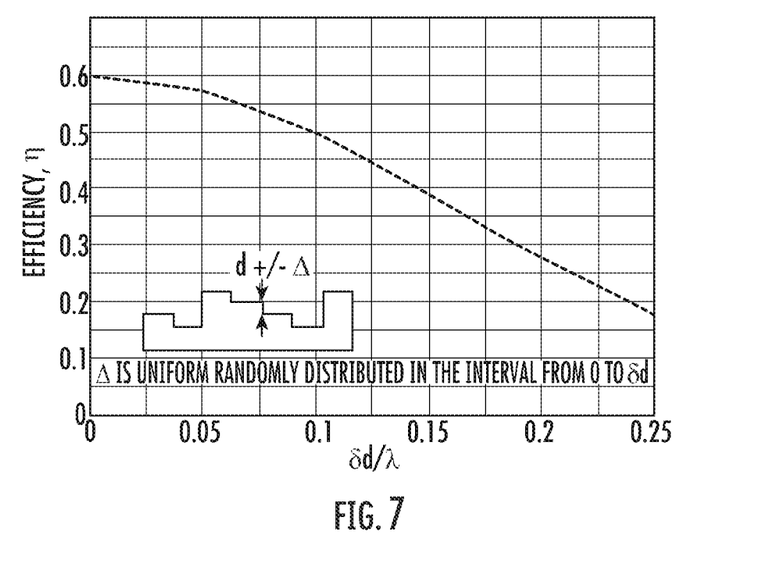
FIG. 7 is a graph of the machining tolerance for the depth of the rings forming the Fresnel phase lens, according to an exemplary embodiment.
Figure 8:
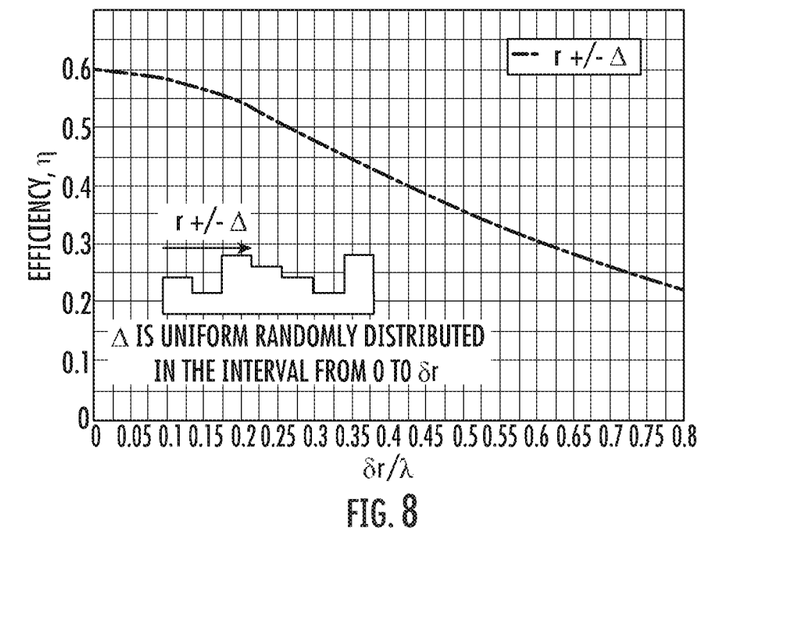
FIG. 8 is a graph of the machining tolerance for the radius of the rings forming the Fresnel phase lens, according to an exemplary embodiment.

FIGS. 7 and 8 are graphs demonstrating the effect of deviations in ring radius and depth on the efficiency of power transmission to the antenna array. FIG. 7 depicts the effect of a deviation in depth from the depth of the steps as defined in Equation 2. As can be seen, the efficiency decreases by less than about 3% for a deviation of up to 5% of the wavelength (δd/λ) and by only about 10% for a deviation of up to 10% of wavelength. FIG. 8 depicts the effect of a deviation in radius from the radius of the rings as defined in Equation 1. As can be seen, the efficiency decreases by less than about 2% for a deviation of up to 10% of wavelength (δr/λ) and by only about 10% for a deviation of up to 30% of wavelength.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A Fresnel phase lens for a 5G antenna, comprising:
   a glass-ceramic material having a first major surface and a second major surface, the first major surface and the second major surface defining a thickness therebetween;
   wherein the first major surface defines a plane;
   wherein the glass-ceramic material comprises a first plurality rings having first ring surfaces in the plane and a second plurality of rings having second ring surfaces at a first depth into the thickness and below the plane; and
   wherein the glass-ceramic material comprises ceramic grains having a size of less than 1 micrometer and is transparent to electromagnetic radiation having a frequency of from 20 GHz to 100 GHz.

2. The Fresnel phase lens of claim 1, wherein the glass-ceramic material comprises at least one of magnesium aluminosilicate glass-ceramic having a cordierite crystalline phase, spinel-ghanite glass-ceramic, petalite glass-ceramic, or a glass-ceramic of borosilicate glass comprising fluorphlogopite mica.

3. The Fresnel phase lens of claim 1, wherein the glass-ceramic material comprises a third plurality of rings, the third plurality of rings having third ring surfaces at a second depth into the thickness and below the second ring surfaces.

4. The Fresnel phase lens of claim 3, wherein the second depth is twice the first depth.

5. The Fresnel phase lens of claim 4, wherein the first depth is determined according to an equation of d=λ/3 ($\sqrt{\in}$–1) in which d is the first depth, λ is a wavelength of the electromagnetic radiation, and ∈ is a dielectric constant of the glass-ceramic material.

6. The Fresnel phase lens of claim 5, wherein the second depth is machined to within 0.05λ, of d as calculated according to the equation.

7. The Fresnel phase lens of claim 3, wherein the glass-ceramic material comprises a fourth plurality of rings, the fourth plurality of rings having fourth ring surfaces at a third depth into the thickness and below the third ring surfaces.

8. The Fresnel phase lens of claim 7, wherein the second depth is twice the first depth and the third depth is three times the first depth.

9. The Fresnel phase lens of claim 1, wherein the glass-ceramic material comprises a dielectric constant of at least 5.

10. An antenna unit, comprising:
    an antenna array comprising a plurality of antennas, the antenna array defining a first plane; and
    a Fresnel phase lens comprising a glass-ceramic material with a ceramic grain size of less than 1 micrometer and that is transparent to electromagnetic radiation having a frequency from 20 GHz to 100 GHz, the Fresnel phase lens having a first major surface and a second major surface, the first major surface and the second major surface defining a thickness therebetween, wherein the Fresnel phase lens defines a second plane and wherein the Fresnel phase lens is spaced apart from the antenna array such that the second plane is substantially parallel to the first plane of the antenna array;
    wherein the Fresnel phase lens comprises a first plurality rings having first ring surfaces at least partially defining the first major surface and a second plurality of rings having second ring surfaces at a first depth into the thickness and below the first major surface; and wherein the first plurality of rings and the second plurality of rings collimate the electromagnetic radiation incident on the Fresnel phase lens that is transmitted to or emitted from the antenna array.

11. The antenna unit of claim 10, wherein the glass-ceramic material comprises at least one of magnesium aluminosilicate glass-ceramic having a cordierite crystalline phase, spinel-ghanite glass-ceramic, petalite glass-ceramic, or a glass-ceramic of borosilicate glass comprising fluorphlogopite mica.

12. The antenna unit of claim 10, wherein the Fresnel phase lens comprises a third plurality of rings, the third plurality of rings having third ring surfaces at a second depth into the thickness and below the second ring surfaces.

13. The antenna unit of claim 12, wherein the second depth is twice the first depth.

14. The antenna unit of claim 13, wherein the Fresnel phase lens comprises a fourth plurality of rings, the fourth plurality of rings having fourth ring surfaces at a third depth into the thickness and below the third ring surfaces.

15. The antenna unit of claim 14, wherein the second depth is twice the first depth and the third depth is three times the first depth.

16. The antenna unit of claim 10, wherein, in a frequency range of 20 GHz to 100 GHz, the glass-ceramic material comprises a loss tangent of less than 0.02.

17. A method, comprising:

providing a glass-ceramic material with a ceramic grain size of less than 1 micrometer and that is transparent to electromagnetic radiation having a frequency of 20 GHz to 100 GHz, the glass-ceramic material comprising a first major surface and a second major surface, the first major surface being opposite to the second major surface and the first major surface and the second major surface defining a thickness therebetween; and removing material from the first major surface of the glass-ceramic material so as to define a Fresnel phase lens including a first plurality of rings and a second plurality of rings, wherein the first plurality of rings have first ring surfaces at the first major surface and the second plurality of rings have second rings surfaces at a first depth below the first major surface.

18. The method of claim 17, wherein the step of removing material comprises milling or grinding.

19. The method of claim 17, further comprising removing material from the first major surface of the glass-ceramic material so as to further define a third plurality of rings, the third plurality of rings having third ring surfaces at a second depth below the first major surface, wherein the second depth is greater than the first depth.

20. The method of claim 19, wherein the second depth is twice the first depth.

* * * * *

UNITED STATES PATENT AND TRADEMARK OFFICE
CERTIFICATE OF CORRECTION

PATENT NO. : 11,239,566 B2
APPLICATION NO. : 17/023751
DATED : February 1, 2022
INVENTOR(S) : Nicholas Francis Borrelli et al.

It is certified that error appears in the above-identified patent and that said Letters Patent is hereby corrected as shown below:

On the Title Page

Item (57), in Column 2, in "Abstract", Lines 6-7, delete "plurality rings" and insert -- plurality of rings --.

Item (57), in Column 2, in "Abstract", Line 9, delete "glass ceramic" and insert -- glass-ceramic --.

In the Specification

In Column 1, Line 8 (approx.), delete "2019 the" and insert -- 2019, the --.

In the Claims

In Column 8, Lines 14-15, in Claim 1, delete "plurality rings" and insert -- plurality of rings --.

In Column 8, Line 25, in Claim 2, delete "spinel-ghanite" and insert -- spinel-gahnite --.

In Column 8, Line 40, in Claim 6, delete "0.05λ," and insert -- 0.05λ --.

In Column 8, Lines 66-67, in Claim 10, delete "plurality rings" and insert -- plurality of rings --.

In Column 9, Line 10 (approx.), in Claim 11, delete "spinel-ghanite" and insert -- spinel-gahnite --.

Signed and Sealed this
Seventeenth Day of May, 2022

Katherine Kelly Vidal
*Director of the United States Patent and Trademark Office*